United States Patent
Amagai et al.

(10) Patent No.: US 8,634,116 B2
(45) Date of Patent: Jan. 21, 2014

(54) IMAGE READING DEVICE AND IMAGE FORMING APPARATUS

(75) Inventors: Sei Amagai, Kanagawa (JP); Noriko Arai, Kanagawa (JP); Kenji Ueda, Kanagawa (JP); Shinji Hanaoka, Kanagawa (JP); Chihiro Matsuguma, Kanagawa (JP); Atsushi Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 301 days.

(21) Appl. No.: 13/236,242

(22) Filed: Sep. 19, 2011

(65) Prior Publication Data
US 2012/0176654 A1 Jul. 12, 2012

(30) Foreign Application Priority Data
Jan. 11, 2011 (JP) .................. 2011-002731

(51) Int. Cl.
| G03F 3/08 | (2006.01) |
| H04N 1/04 | (2006.01) |
| G06K 9/32 | (2006.01) |
| G03G 15/01 | (2006.01) |
| B41J 2/47 | (2006.01) |
| B41J 2/45 | (2006.01) |
| H04N 9/093 | (2006.01) |

(52) U.S. Cl.
USPC ........... 358/518; 358/474; 382/294; 347/116; 347/234; 347/238; 348/263

(58) Field of Classification Search
USPC ........... 358/518, 474; 382/294; 347/116, 234, 347/238; 348/263
See application file for complete search history.

(56) References Cited

U.S. PATENT DOCUMENTS 6,035,076 A * 3/2000 Nagase ........................ 382/294
7,092,019 B1 * 8/2006 Ogata et al. .................. 348/263

FOREIGN PATENT DOCUMENTS

JP 2002-281324 A 9/2002

* cited by examiner

Primary Examiner — Charlotte M Baker
(74) Attorney, Agent, or Firm — Sughrue Mion, PLLC

(57) ABSTRACT

An image reading device includes a reading unit, a first correcting unit, and a second correcting unit. The reading unit includes multiple read pixel-arrays and converts a signal charge obtained from pixels in each read pixel-array to an electric signal and outputs the electric signal as a read signal of each read pixel-array. The first correcting unit individually delays the read signals of the respective read pixel-arrays output from the reading unit so as to correct misregistration of the read signals. The second correcting unit corrects the misregistration of the read signals of the respective read pixel-arrays corrected by the first correcting unit by performing a two-point interpolation process so that a correction amount for the read signal of one specific read pixel-array among the multiple read pixel-arrays is not smaller than a correction amount for the read signal or signals of the remaining read pixel-array or pixel-arrays.

15 Claims, 13 Drawing Sheets

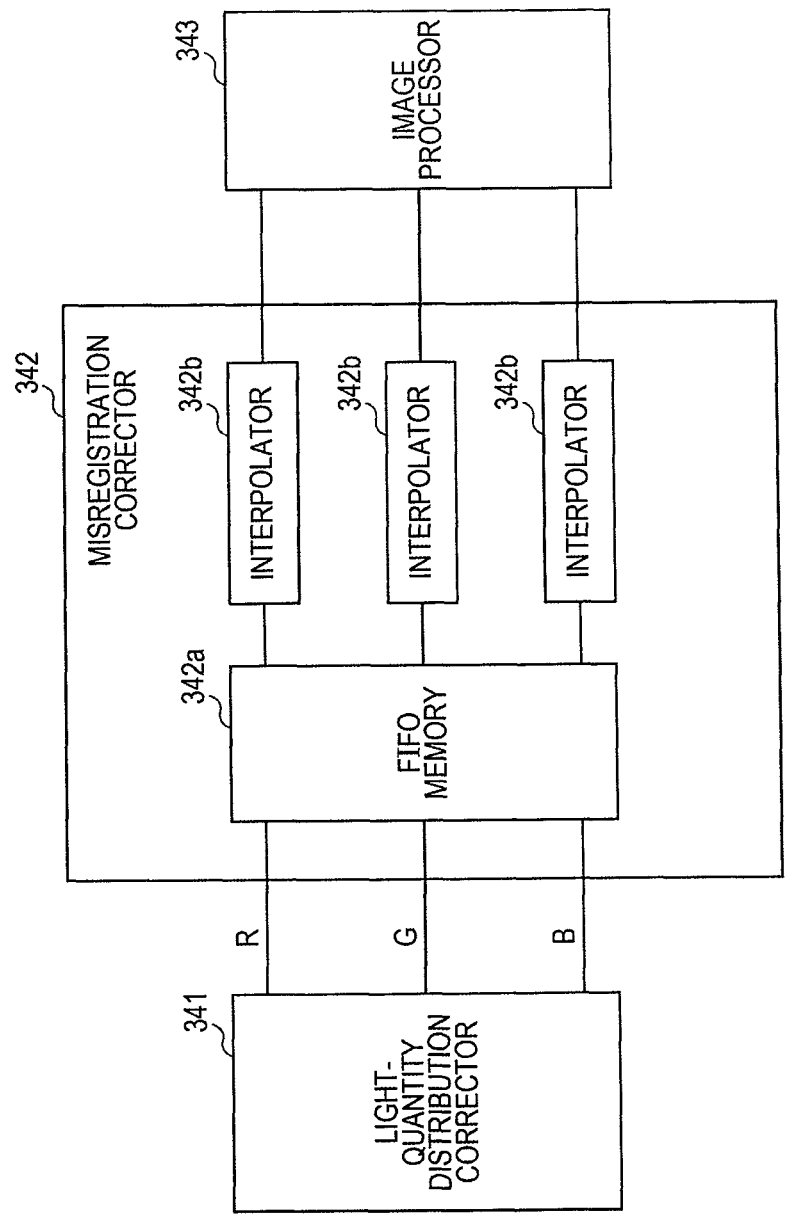

ure device according to an exemplary embodiment of the present invention.

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2011-002731 filed Jan. 11, 2011.

BACKGROUND (i) Technical Field

The present invention relates to image reading devices and image forming apparatuses.

SUMMARY

According to an aspect of the invention, there is provided an image reading device including a reading unit, a first correcting unit, and a second correcting unit. The reading unit includes multiple read pixel-arrays and converts a signal charge obtained from pixels in each read pixel-array to an electric signal and outputs the electric signal as a read signal of each read pixel-array. The first correcting unit individually delays the read signals of the respective read pixel-arrays output from the reading unit so as to correct misregistration of the read signals. The second correcting unit corrects the misregistration of the read signals of the respective read pixel-arrays corrected by the first correcting unit by performing a two-point interpolation process so that a correction amount for the read signal of one specific read pixel-array among the multiple read pixel-arrays is not smaller than a correction amount for the read signal or signals of the remaining read pixel-array or pixel-arrays.

BRIEF DESCRIPTION OF THE DRAWINGS

Exemplary embodiment(s) of the present invention will be described in detail based on the following figures, wherein:

FIG. 5 illustrates a configuration example of a misregistration corrector;

DETAILED DESCRIPTION

Exemplary embodiments of the present invention will be described in detail below with reference to the attached drawings.

Image Reading Device

Figure 1:
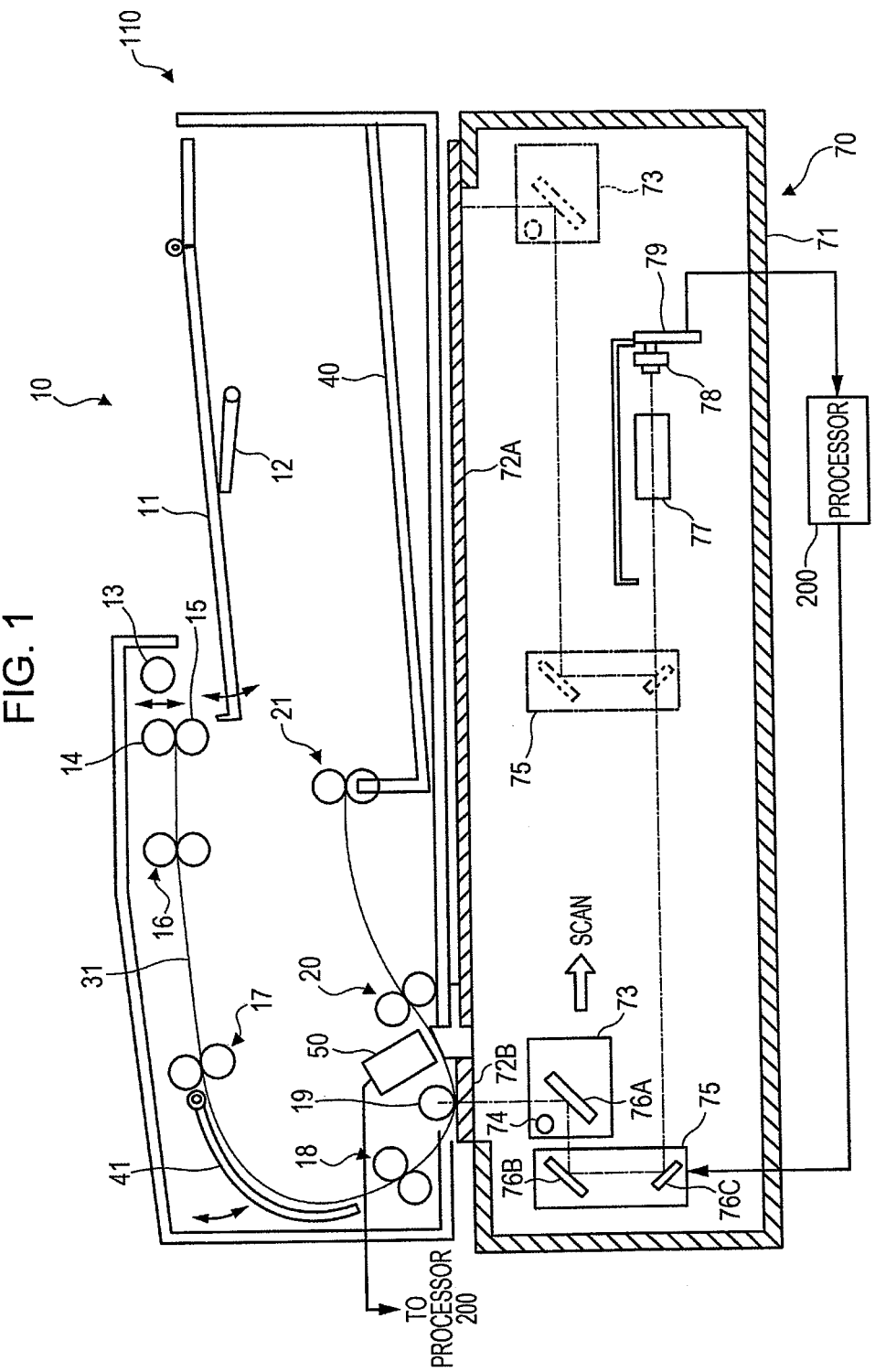
FIG. 1 illustrates a configuration example of an image reading device according to an exemplary embodiment.

FIG. 1 illustrates a configuration example of an image reading device 110 according to an exemplary embodiment of the present invention.

The image reading device 110 includes a document feeder 10 that sequentially transports documents one by one from stacked sheets of documents, a scanner 70 that reads an image by scanning, and a processor 200 that processes a read image signal.

The document feeder 10 includes a first document holder 11 that holds the multiple stacked sheets of documents and a lifter 12 that lifts or lowers the first document holder 11. The document feeder 10 further includes a document transport roller 13 that transports each document on the first document holder 11 lifted by the lifter 12, a feed roller 14 that transports each document transported by the document transport roller 13 further downstream, and a retard roller 15 that handles the documents transported by the document transport roller 13 in a one-by-one manner. A document transport path 31 to which each document is transported is provided with a take-away roller 16 that transports the document to rollers located downstream and a pre-registration roller 17 that transports the document to rollers located further downstream and that also forms a loop.

The document transport path 31 is also provided with a registration roller 18 that supplies the document to a document reader while performing registration adjustment for the document reader by temporarily stopping its rotation and then subsequently resuming its rotation at a certain timing. Moreover, the document transport path 31 is also provided with a platen roller 19 that assists in the transportation of the document when being read and an outward roller 20 that transports the read document further downstream. Furthermore, the document transport path 31 is provided with a baffle plate 41 that rotates about a pivot in accordance with the looped state of the transported document. An image reading unit 50 that reads an image on the document is provided between the platen roller 19 and the outward roller 20. Furthermore, a second document holder 40 that holds the document having undergone the reading process and a discharge roller 21 that discharges the document to the second document holder 40 are provided downstream of the outward roller 20 in the transport direction of the document.

The document transport roller 13 when on standby is held at a retreated position by being lifted upward, and is lowered to a nipping position (document transporting position) when performing document transportation so as to transport the topmost document on the first document holder 11. The feed roller 14 transports the document transported by the document transport roller 13 further downstream. The pre-registration roller 17 brings the leading edge of the document into abutment with the registration roller 18 in a stopped state so that the document forms a loop. In the registration roller 18, the leading edge of the document gripped by the registration roller 18 during the loop formation is returned to a nipping position. When this loop is formed, the baffle plate 41 rotates and opens about the pivot so that the baffle plate 41 does not hinder the document from forming the loop. The take-away roller 16 and the pre-registration roller 17 maintain the loop when the reading process is being performed. With the formation of the loop, the read timing is adjusted, and the skew of the document can be minimized.

The scanner 70 supports the aforementioned document feeder 10 by using a device frame 71 and reads an image from the document transported by the document feeder 10. The scanner 70 has a first platen glass 72A that is disposed at an upper section of the device frame 71 and that holds the document still from which the image is to be read, and a second platen glass 72B that forms an optical aperture for reading the document transported by the document feeder 10. In this exemplary embodiment, the document feeder 10 can be rotated about a pivot provided at the far side of the image reading device 110. Moreover, in this exemplary embodiment, by rotating the document feeder 10 upward about this pivot, the document feeder 10 is moved upward so that a document can be set on the first platen glass 72A.

The scanner 70 includes a full rate carriage 73 that is set still below the second platen glass 72B and that reads an image by scanning the entire first platen glass 72A. The scanner 70 also includes a half rate carriage 75 that provides light obtained from the full rate carriage 73 to an image combiner. The full rate carriage 73 is provided with an illumination lamp 74 that emits light toward the document and a first mirror 76A that optically receives the light reflected from the document. The half rate carriage 75 is provided with a second mirror 76B and a third mirror 76C that provide the light obtained from the first mirror 76A to an imaging unit. The scanner 70 further includes an imaging lens 77 that optically demagnifies an optical image obtained from the third mirror 76C, and a charge-coupled device (CCD) image sensor 78 that performs photoelectric conversion on the optical image formed by the imaging lens 77. The scanner 70 is provided with a drive substrate 79. The drive substrate 79 converts an analog image signal obtained by the CCD image sensor 78 to a digital image signal. Then, the digital signal is transmitted to the processor 200.

When an image of a document placed on the first platen glass 72A is to be read, the full rate carriage 73 and the half rate carriage 75 move in a scanning direction (i.e., a direction indicated by an arrow) at a ratio of 2:1. At this time, the light from the illumination lamp 74 of the full rate carriage 73 is emitted toward a read face of the document, and the reflected light from the document is reflected by the first mirror 76A, the second mirror 76B, and the third mirror 76C in that order before being guided to the imaging lens 77. An image of the light guided to the imaging lens 77 is formed on a light-receiving surface of the CCD image sensor 78. The CCD image sensor 78 is a one-dimensional sensor that simultaneously processes one line at a time. When one line in the line direction (i.e., a fast scanning direction) is completely read, the full rate carriage 73 moves in a direction orthogonal to the fast scanning direction (i.e., a slow scanning direction) so as to read a subsequent line of the document. By performing this over the entire document, the document reading process for a single page is completed.

When a document transported by the document feeder 10 is to be read, the document transported by the document feeder 10 travels over the second platen glass 72B. At this time, the full rate carriage 73 and the half rate carriage 75 are in a stopped state at positions indicated by solid lines in FIG. 1. Then, reflected light from a first line of the document passing the platen roller 19 of the document feeder 10 travels via the first mirror 76A, the second mirror 76B, and the third mirror 76C to the imaging lens 77 where an image of the light is formed. The image is subsequently read by the CCD image sensor 78.

After one line in the fast scanning direction is simultaneously processed by the CCD image sensor 78, which is a one-dimensional sensor, a subsequent line, in the fast scanning direction, of the document transported by the document feeder 10 is read. Subsequently, when the trailing edge of the document passes a read position of the second platen glass 72B, the reading process for a single page in the slow scanning direction is completed. In this exemplary embodiment, when the CCD image sensor 78 reads a first face of the document, the image reading unit 50 simultaneously reads a second face of the document. Accordingly, both faces of the document can be read in a single transporting process without having to transport the document multiple times. The term "simultaneously" used above does not refer to an exact matching point in terms of time, but refers to the same transporting process of the document.

The image reading unit 50 is provided between the platen roller 19 and the outward roller 20. The first face of the document is pressed against the second platen glass 72B, and the image on the first face is read by the CCD image sensor 78, as described above. The image on the second face of the document is read by the image reading unit 50.

The image reading unit 50 includes a light-emitting diode (LED) (not shown) that emits light toward the second face of the document. Moreover, the image reading unit 50 is provided with a line sensor (not shown) that performs photoelectric conversion on the reflected light from the document after the light is focused by a lens. An analog image data signal obtained by the line sensor of the image reading unit 50 is converted to a digital image signal before being transmitted to the processor 200.

Configuration of Image Reading Mechanism

An image reading mechanism according to this exemplary embodiment will now be described.

Figure 2:
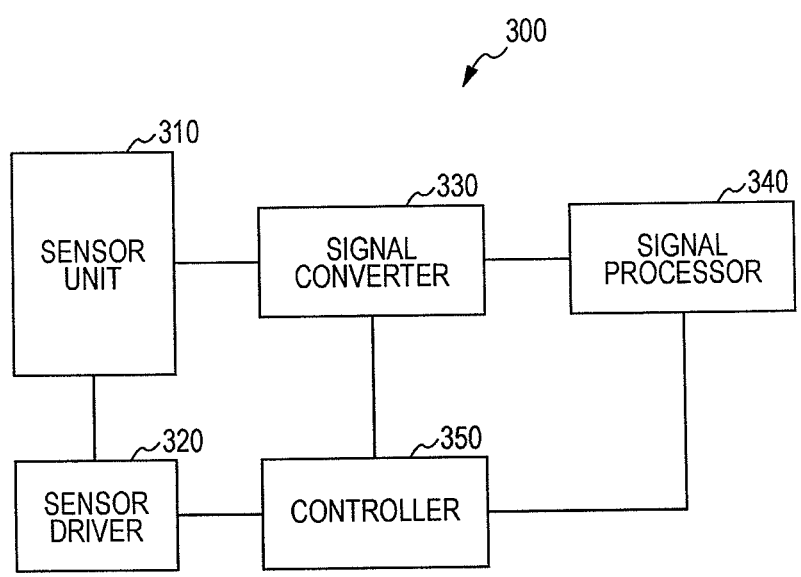
FIG. 2 illustrates a configuration example of an image reading mechanism according to the exemplary embodiment.

FIG. 2 illustrates a configuration example of an image reading mechanism 300 according to this exemplary embodiment.

The image reading mechanism 300 shown in FIG. 2 includes a sensor unit 310, a sensor driver 320, a signal converter 330, a signal processor 340, and a controller 350. The sensor unit 310 functions as, for example, the CCD image sensor 78 or the line sensor of the image reading unit 50 in the image reading device 110 shown in FIG. 1. The sensor driver 320 and the signal converter 330 function as, for example, the drive substrate 79 or a circuit (drive substrate) that drives the line sensor of the image reading unit 50 in the image reading device 110 shown in FIG. 1. The signal processor 340 and the controller 350 functions as, for example, the processor 200 in the image reading device 110 shown in FIG. 1.

Figure 3:
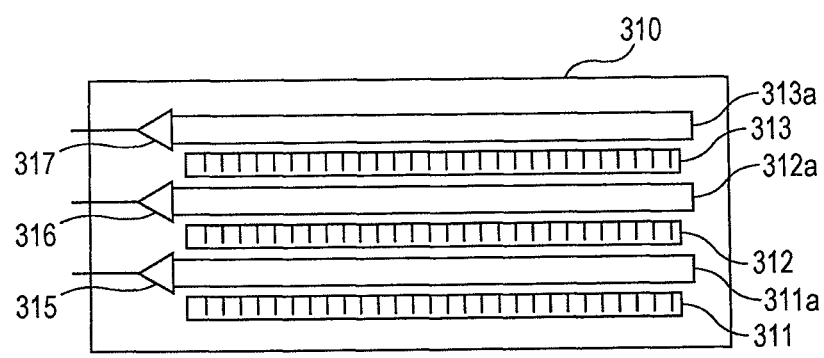
FIG. 3 illustrates a configuration example of a sensor unit.

FIG. 3 illustrates a configuration example of the sensor unit 310.

The sensor unit 310 shown in FIG. 3 is a reading unit that reads an image and includes three pixel arrays (CCD line sensors) 311 to 313 serving as read pixel-arrays. The sensor unit 310 includes transfer registers 311a to 313a respectively provided as charge transfer sections for the pixel arrays 311 to 313. Furthermore, the sensor unit 310 includes output amplifiers 315 to 317 as output sections that convert a signal charge output from the transfer registers 311a to 313a to voltage and output the voltage.

The pixel arrays 311 to 313 are formed by, for example, arranging n photodiodes (pixels), each having a size of 10 µm×10 µm, in lines that are parallel to each other. The pixel arrays 311 to 313 with the three-line configuration have light-receiving surfaces that are individually provided with color filters corresponding to RGB (red, green, and blue) color components. Accordingly, the pixel arrays 311 to 313 serve as a group of read pixel-arrays that read optical images of the RGB color components for capturing a color image. The pixel arrays 311 to 313 are normally arranged at an even pitch.

As described above, the pixel arrays 311 to 313 are respectively provided with the transfer registers 311a to 313a. An electric charge accumulated as the result of the pixel arrays 311 to 313 receiving light in the image reading process is vertically transferred (shifted) by the transfer registers 311a to 313a due to a shift pulse from an external source. The transfer registers 311a to 313a horizontally transfer the signal charge received from the pixel arrays 311 to 313 based on a main clock signal (transfer timing signal) and output the signal charge to the output amplifiers 315 to 317.

In accordance with a final pulse (output timing signal) received from an external source, each of the output amplifiers 315 to 317 outputs an output signal based on the signal charge output from the corresponding transfer register 311a to 313a.

Although not shown, the sensor driver 320 includes a horizontal transfer driver, a vertical transfer driver, and an output driver. The sensor driver 320 further includes a power source (not shown) that supplies power to these drivers. The horizontal transfer driver supplies a main clock signal (horizontal transfer clock signal) for driving the transfer registers 311a to 313a to the sensor unit 310. The vertical transfer driver supplies a shift pulse to the sensor unit 310 so as to shift (vertically transfer) the signal charge from the pixel arrays 311 to 313 to the corresponding transfer registers 311a to 313a. The output driver supplies a final pulse for driving the output amplifiers 315 to 317 to the sensor unit 310.

The signal converter 330 amplifies an output signal (analog signal) from the sensor unit 310 and converts the signal to a digital signal (that is, performs analog-to-digital conversion). The output signal from the sensor unit 310, which is converted to a digital signal, is transmitted to the signal processor 340. With regard to the amplification of the output signal, the digital signal obtained after the conversion may be amplified instead of or in addition to amplifying the analog signal prior to the conversion.

Figure 4:
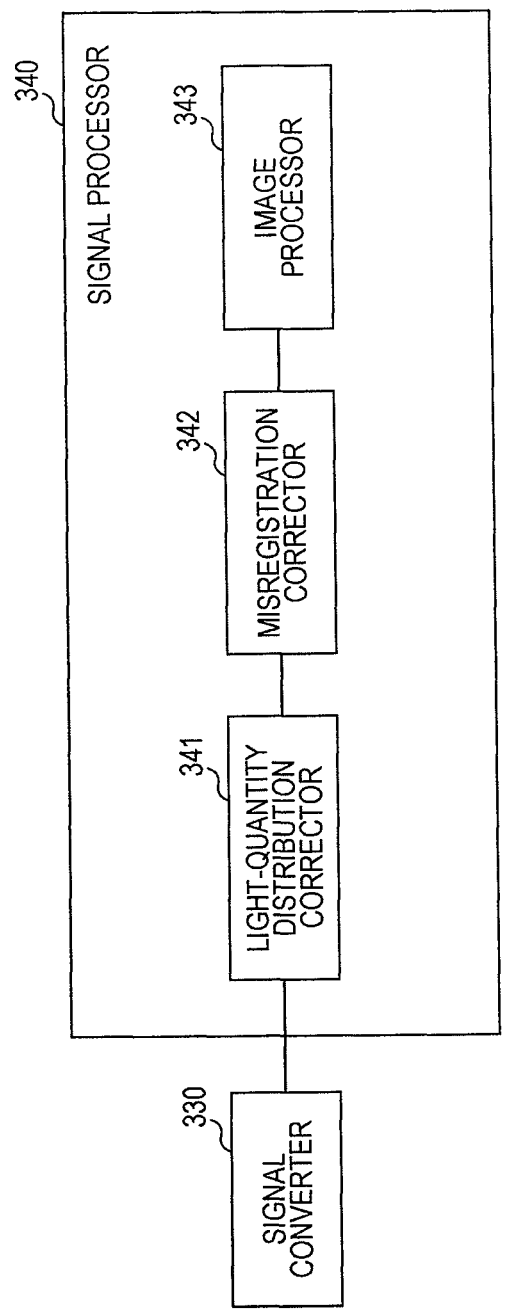
FIG. 4 illustrates a configuration example of a signal processor.

FIG. 4 illustrates a configuration example of the signal processor 340.

The signal processor 340 performs necessary correction on the output signal amplified and A/D-converted by the signal converter 330 so as to perform image processing. Accordingly, digital image data is generated. The signal processor 340 shown in FIG. 4 includes a light-quantity distribution corrector 341, a misregistration corrector 342, and an image processor 343.

The light-quantity distribution corrector 341 performs so-called shading correction on the output signal received from the signal converter 330 by correcting a substantial variation in the sensitivity of the pixels constituting the pixel arrays 311 to 313 in the sensor unit 310 on the basis of the variation in the sensitivity of the pixels and light-quantity distribution characteristics of an optical system (see FIG. 1).

FIG. 5 illustrates a configuration example of the misregistration corrector 342.

As shown in FIG. 5, the misregistration corrector 342 includes a first-in first-out (FIFO) memory 342a for delay processing and interpolators 342b that perform an interpolation process between two points in the slow scanning direction. The misregistration corrector 342 corrects a time lag (misregistration) between (or synchronizes) read images, which occurs on the basis of the arranged pitch of the pixel arrays 311 to 313. A specific process performed by the misregistration corrector 342 will be described in detail later.

Where necessary, the image processor 343 performs image processing, such as color conversion, scaling, background removal, and binarization, on each output signal (read image) having undergone the various kinds of correction described above.

The controller 350 shown in FIG. 2 is in charge of the operational settings for the image reading process and controls the operation of the sensor driver 320, the signal converter 330, and the signal processor 340 described above. Accordingly, the image reading process is performed by the sensor unit 310, and various kinds of processing are performed on the read image, whereby an image converted to digital data is obtained.

Correction by Misregistration Corrector

As described above with reference to FIG. 3, the sensor unit 310 according to this exemplary embodiment includes three pixel arrays 311 to 313 that are arranged parallel to each other. In the sensor unit 310, the direction in which the pixel arrays 311 to 313 extend is the fast scanning direction, and the direction orthogonal to the fast scanning direction is the slow scanning direction. When reading an image, the sensor unit 310 moves in the slow scanning direction relative to the image to be read while obtaining output signals from the pixel arrays 311 to 313. Positions on the image that the pixel arrays 311 to 313 read are displaced relative to each other by a distance equivalent to the pitch of the pixel arrays 311 to 313 based on the arrangement of the pixel arrays 311 to 313. Therefore, with regard to RGB output signals from the pixel arrays 311 to 313, two output signals lag behind one output signal on the basis of the arrangement of the pixel arrays 311 to 313 and the read rate (i.e., the moving speed of the sensor unit 310 in the slow scanning direction).

Specifically, for example, assuming that the pixel array 311 side in FIG. 3 is the direction of travel in the slow scanning direction, the output signal from the pixel array 312 lags behind the output signal from the pixel array 311 by a certain amount based on the distance between the pixel array 311 and the pixel array 312 and the read rate. Similarly, the output signal from the pixel array 313 lags behind the output signal from the pixel array 311 by a certain amount based on the distance between the pixel array 311 and the pixel array 313 and the read rate.

The misregistration corrector 342 corrects the misregistration of the output signals (read images) occurring as described above due to the pixel arrays 311 to 313. As shown in FIG. 5, the misregistration corrector 342 includes the FIFO memory 342a and the interpolators 342b. The FIFO memory 342a serves as a first correcting unit that performs delay processing so as to correct misregistration for each array (i.e., each line) of the pixels constituting the sensor unit 310. The interpolators 342b serve as a second correcting unit that performs an interpolation process between two points in the slow scanning direction if the amount of misregistration is smaller than an amount equivalent to one line of pixels.

Figure 6B:
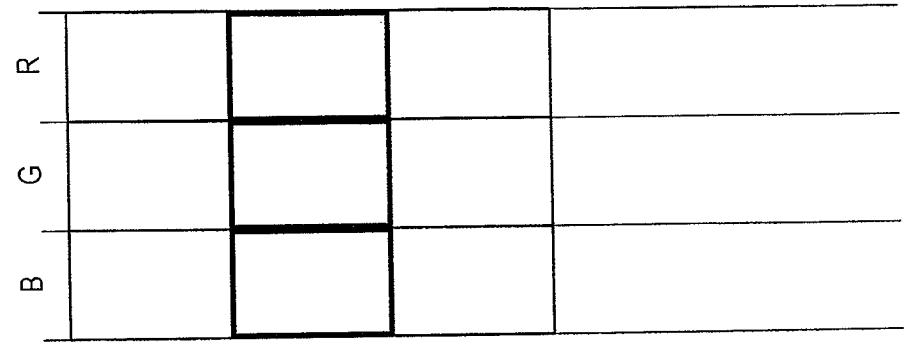
FIGS. 6A and 6B illustrate misregistration of output signals from pixel arrays of the sensor unit and a correction process performed by the misregistration corrector.
Figure 6A:
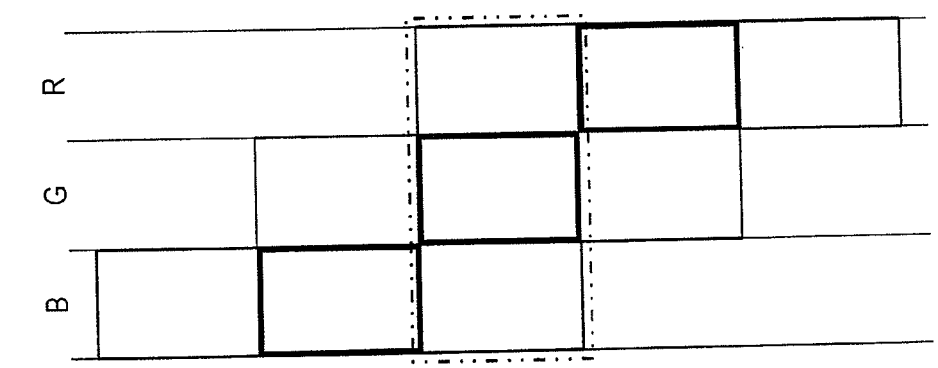

FIGS. 6A and 6B illustrate the misregistration of the output signals from the pixel arrays 311 to 313 of the sensor unit 310 and the correction process performed by the misregistration corrector 342.

In this exemplary embodiment, the pixel arrays 311 to 313 of the sensor unit 310 are arranged with gaps therebetween. Specifically, the pixel arrays 311 to 313 are spaced apart from each other by a distance (gap) equivalent to the width of one pixel array. Of the RGB colors, the pixel array 311 corresponds to the R color, the pixel array 312 corresponds to the G color, and the pixel array 313 corresponds to the B color. When the sensor unit 310 travels in the slow scanning direction, the pixel array 311 (R), the pixel array 312 (G), and the pixel array 313 (B) sequentially read the same location of the image to be read in that order.

As described above, there is a certain lag between the output signals from the pixel arrays 311 to 313 on the basis of the relationship between the distance (gaps) between the pixel arrays 311 to 313 and the read rate. In other words, there is certain displacement between the positions of the image to be read simultaneously by the pixel arrays 311 to 313 in correspondence with the positions of the pixel arrays 311 to 313. If the resolution is changed when the image reading device 110 performs an image reading process, the image read rate may sometimes change. In this case, the lag between the output signals from the pixel arrays 311 to 313 also changes, resulting in a change in the displacement amount between the positions of the image read simultaneously by the pixel arrays 311 to 313. This will be described in detail below on a case-by-case basis.

FIG. 6A illustrates read timings by the pixel arrays 311 to 313. In FIG. 6A, rows of R, G, and B blocks are obtained by arranging, in a time-series fashion, output signals from specific pixels whose positions in the fast scanning direction in the pixel arrays 311 to 313 are the same (referred to as "specific pixels" hereinafter). In other words, each row of R, G, and B blocks is a row of read signals obtained from a strip-like (linear) area in the image. This strip-like (linear) area extends in the slow scanning direction at a position corresponding to the specific pixels.

In FIG. 6A, R, G, and B blocks arranged in the lateral direction (e.g., an area surrounded by a dot-chain line) indicate read signals of image sections simultaneously read by the specific pixels of the pixel arrays 311 to 313 at a specific time point. A block indicated by a thick line in each row of blocks indicates an output signal from the specific pixel of the corresponding pixel array 311 to 313 when the same specific location in the image is read.

Therefore, a lag between the output signals from the pixel arrays 311 to 313 in FIG. 6A is equivalent to one line between the R and G colors and one line between the G and B colors (i.e., two lines between the R and B colors). In other words, when the pixel array 312 reads a specific image section, the pixel array 311 simultaneously reads an adjacent image section ahead of the specific image section by one line, and the pixel array 313 simultaneously reads an adjacent image section behind the specific image section by one line.

In this case, the misregistration corrector 342 performs correction by delaying the preceding R and G output signals. Specifically, the FIFO memory 342a delays the R output signal by two lines and the G output signal by one line so as to positionally align these output signals with the B output signal. FIG. 6B illustrates the output signals in FIG. 6A in an aligned state obtained by delaying the R and G output signals to align these output signals with the B output signal.

In the example shown in FIG. 6A, the lag between the output signals of the respective colors for the same location of the image is equivalent to an integral multiple of one line of the pixel arrays 311 to 313. Therefore, by causing the FIFO memory 342a to delay the preceding output signals, an amount of misregistration equivalent to an integral multiple of one line can be compensated for, whereby the output signals of the respective colors for the same location of the image can be aligned with each other. In contrast, if the lag between the output signals from the pixel arrays 311 to 313 is not equivalent to an integral multiple of one line, simply performing the delay processing using the FIFO memory 342a would still result in an amount of misregistration smaller than an amount equivalent to one line. In such a case, the interpolators 342b perform an interpolation process between two points in the slow scanning direction.

Figure 7B:
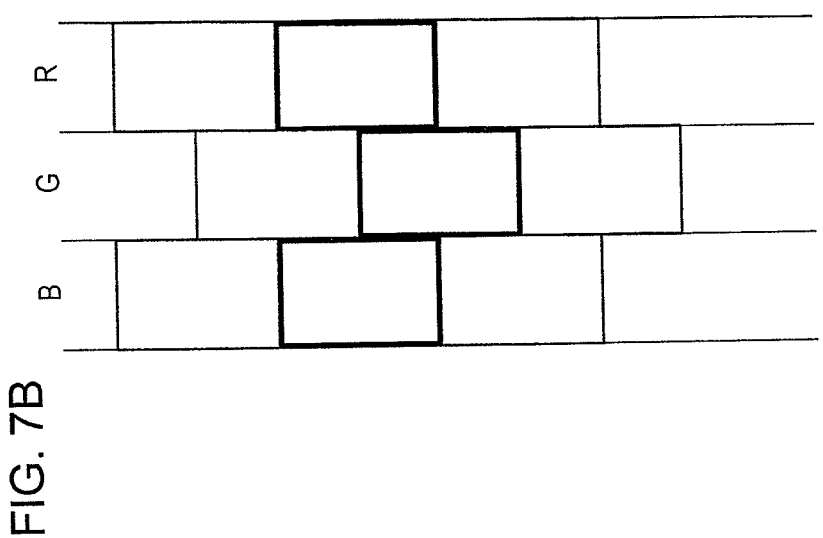
FIGS. 7A and 7B illustrate an example in which an amount of misregistration of the output signals from the pixel arrays is smaller than an amount equivalent to one line.
Figure 7A:
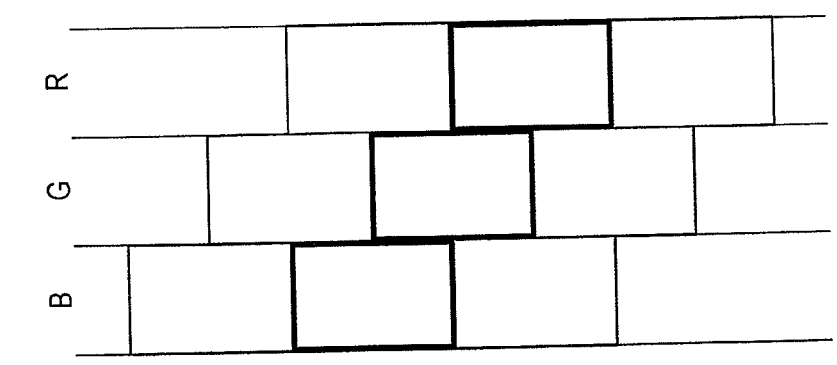

FIGS. 7A and 7B illustrate an example in which an amount of misregistration of the output signals from the pixel arrays 311 to 313 is smaller than an amount equivalent to one line.

In the example shown in FIG. 7A, a lag between the output signals from the pixel arrays 311 to 313 is equivalent to 0.5 lines. In this case, as shown in FIG. 7B, the R output signal is delayed by one line so as to be positionally aligned with the B output signal. In contrast, since the G output signal lags behind both the R and B output signals by an amount equivalent to 0.5 lines, the G output signal cannot be aligned with these output signals by simply performing the delay processing using the FIFO memory 342a. Therefore, a correction process based on interpolation between two points in the slow scanning direction is performed.

Figure 8:
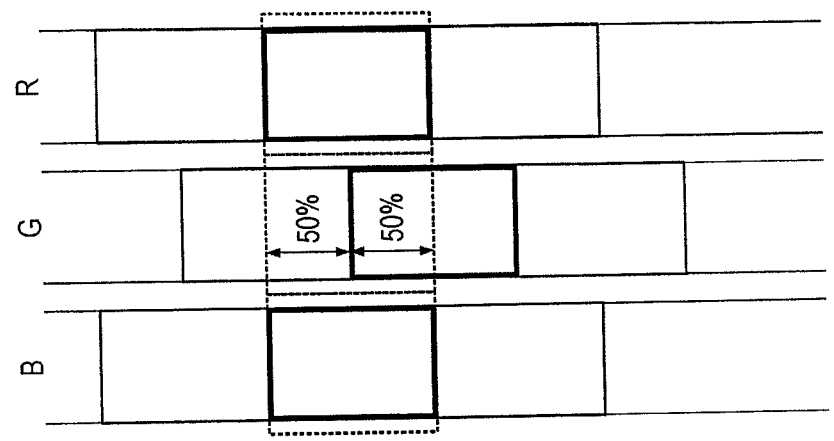
FIG. 8 illustrates an interpolation process between two points in a slow scanning direction.

FIG. 8 illustrates an interpolation process between two points in the slow scanning direction (simply referred to as "two-point interpolation process" hereinafter).

The two-point interpolation process is performed on the output signals from the pixels in the pixel arrays 311 to 313 and is a process for calculating an output signal corresponding to one block by using output signals of two adjacent blocks (two points) in the slow scanning direction (i.e., two temporally successive blocks) in the rows of R, G, and B blocks. For simplifying the description of how the two-point interpolation process is performed, the following description will be only directed to a two-point interpolation process performed for the G color as an example.

As shown in FIG. 8, the intensity (level) of an output signal at a position corresponding to one block to be obtained (i.e., an imaginary block at a position indicated by a dotted line, which will be referred to as "imaginary block" hereinafter) is calculated by using the intensities of output signals of two actual blocks that overlap the imaginary block. Each of these actual blocks will be referred to as "actual block" if the actual block is to be distinguished from the imaginary block. Specifically, the intensities of output signals of two adjacent actual blocks (i.e., a first actual block indicated by a solid line and a second actual block read immediately after the first actual block in the example shown in FIG. 8) are each multiplied by an interpolation coefficient and are added together.

The interpolation coefficient in this case is a coefficient indicating a percentage of how much each actual block overlaps the imaginary block, the intensity of an output signal of which is to be determined. In the examples shown in FIGS. 7A to 8, the G output signal that lags behind the R and B output signals by an amount equivalent to 0.5 lines is to be interpolated. Therefore, the imaginary block in FIG. 8 is overlapped with each of the first and second actual blocks by 50%. Specifically, the interpolation coefficient for each actual block is 0.5. Therefore, an intensity DOUT of the output signal of the imaginary block is determined from the following mathematical expression:

$$DOUT = DIN1 \times 0.5 + DIN2 \times 0.5$$

where DIN1 and DIN2 respectively denote the intensities of the output signals of the two actual blocks and DOUT denotes the intensity of the output signal of the imaginary block.

Generally, of the two actual blocks overlapping the imaginary block, if a percentage by which one of the actual blocks overlaps the imaginary block is expressed by a, the intensity DOUT of the output signal of the imaginary block is calculated from the following mathematical expression:

$$DOUT = DIN1 \times \alpha + DIN2 \times (1-\alpha) \quad (1)$$

In this case, DIN1 denotes the intensity of the output signal of the actual block that overlaps the imaginary block by the percentage α.

Two-Point Interpolation Process According to Exemplary Embodiment

In this exemplary embodiment, the two-point interpolation process is performed on the basis of the following conditions.
1. An imaginary block is set such that the correction amount is substantially the same for output signals of as many colors as possible.
2. An imaginary block is set such that the correction amount is at a maximum for the G output signal (including a case where the correction amount therefor is substantially equal to that for the output signals of the two remaining colors).

Condition 1 is based on the fact that an effect on the overall image quality is smaller when a difference in the correction amount is small between the output signals of the respective colors. Therefore, if the correction amount can be made substantially the same for all the R, G, and B colors, the imaginary block is set in that manner. If the correction amount cannot be made substantially the same for all the R, G, and B colors but the correction amount can be made substantially the same for two colors, the imaginary block is set in that manner. However, the condition of setting the same correction amount for two colors does not necessarily need to be satisfied since an effect such a condition has on the overall image quality is small as compared with the condition in which the correction amount is made substantially the same for all the R, G, and B colors.

Condition 2 is based on the fact that, if the correction amount for the G output signal is smaller than the correction amount for the other colors, a streaky defect tends to occur when the image read by the image forming apparatus is output. Therefore, if the correction amount cannot be made substantially the same for all the R, G, and B colors, the imaginary block is set so that condition 2 is first satisfied, and that, if possible, the correction amount is substantially the same for the two remaining colors.

Figure 9A:
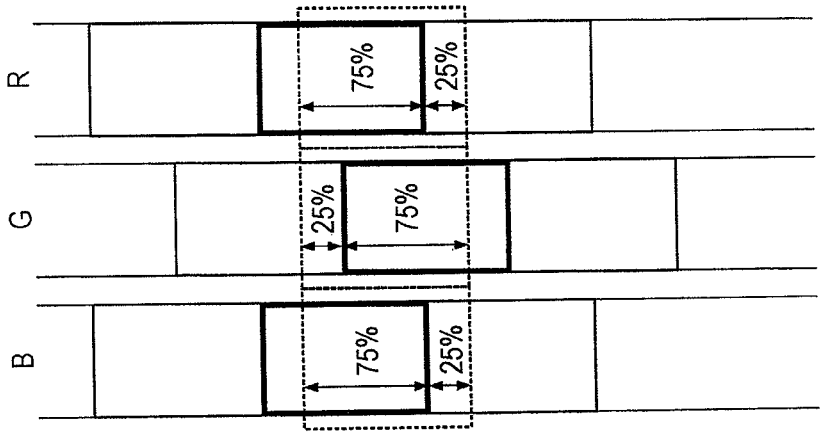
FIGS. 9A and 9B illustrate an example of the interpolation process between two points in the slow scanning direction according to the exemplary embodiment.
Figure 9B:
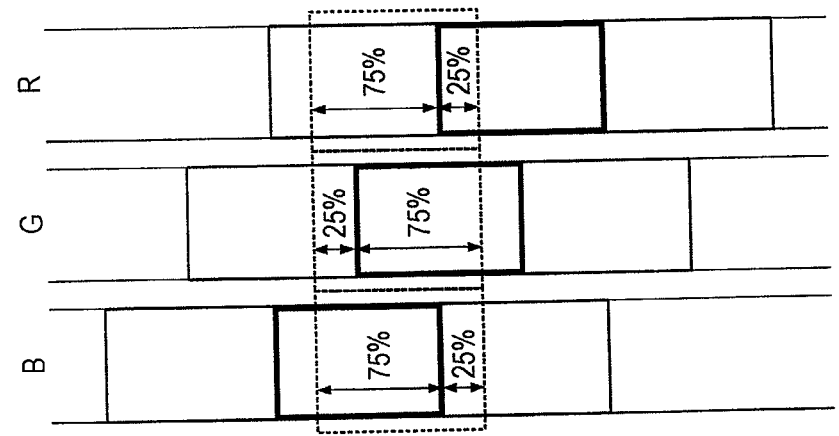

FIGS. 9A and 9B illustrate an example of the two-point interpolation process according to this exemplary embodiment.

The example shown in FIGS. 9A and 9B is similar to the examples shown in FIGS. 7A to 8 in that a lag between the output signals from the pixel arrays 311 to 313 is equivalent to 0.5 lines. Furthermore, in this example, G and B imaginary blocks are overlapped by 75% with actual blocks (indicated by solid lines) expressing read signals of the same image section in the image. As shown in FIG. 9A, an R imaginary block is overlapped by 25% with an actual block (indicated by a solid line) expressing a read signal of the same image section. By using the FIFO memory 342a to delay the R read signal by one line, the R imaginary block becomes overlapped with the R actual block (solid line) by 75%, as shown in FIG. 9B.

As a result of the above operation, the R, G, and B actual blocks expressing the read signals of the same image section in the image overlap the corresponding imaginary blocks by the same percentage (75%). Therefore, conditions 1 and 2 described above are satisfied. In this case, an intensity DOUT of the output signal of each imaginary block is as follows:

$$DOUT = DIN1 \times 0.75 + DIN2 \times 0.25$$

In this case, DIN1 denotes the intensity of the output signal of the corresponding actual block indicated by a solid line.

Figure 10:
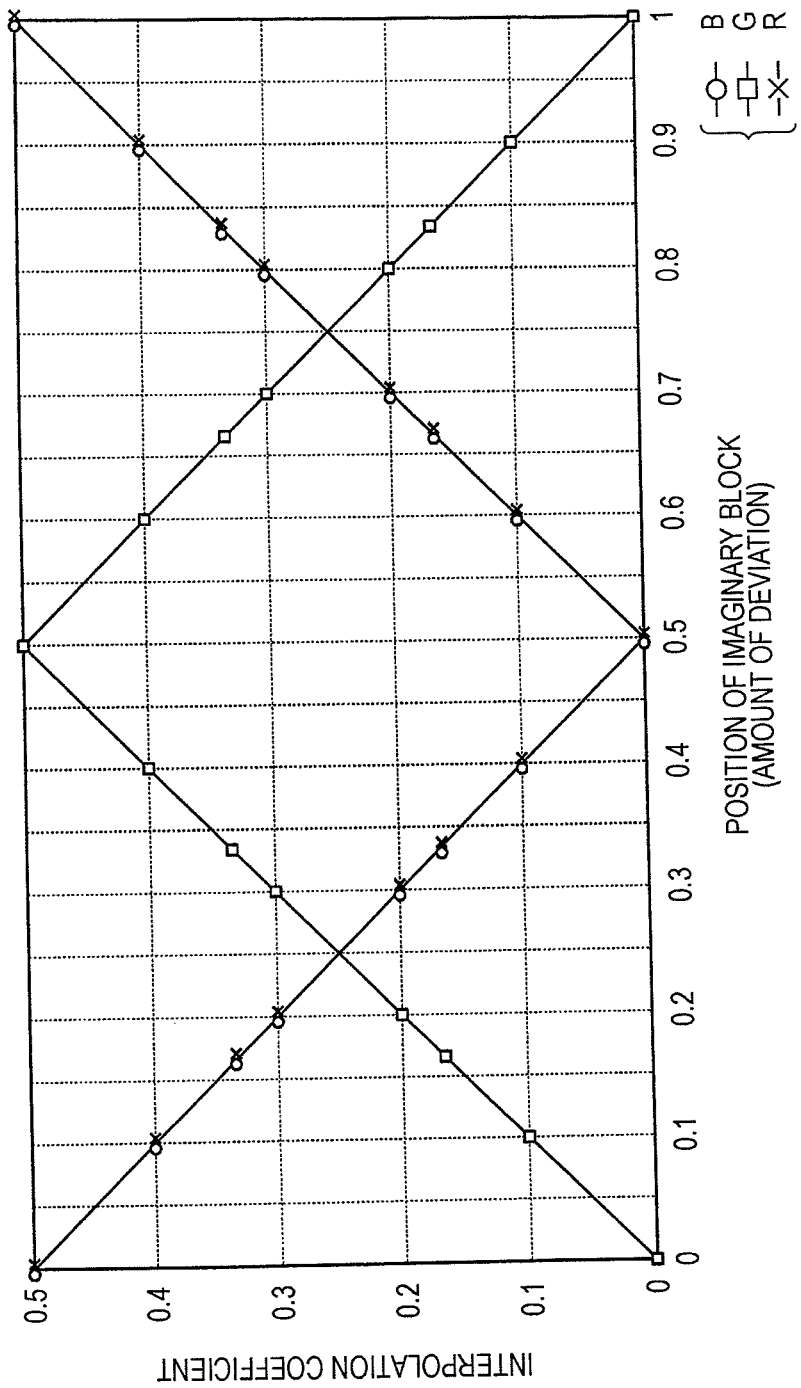
FIG. 10 illustrates the relationship between the position of an imaginary block and an interpolation coefficient in the examples shown in FIGS. 7A to 9B.

FIG. 10 illustrates the relationship between the position of an imaginary block and an interpolation coefficient in the examples shown in FIGS. 7A to 9B.

In a graph shown in FIG. 10, the abscissa denotes the position of an imaginary block on the basis of an amount of deviation thereof from the position of an actual block. Therefore, a minimum value is 0 (i.e., a state where the imaginary block is completely overlapped with a first actual block) and a maximum value is 1 (i.e., a state where the imaginary block is completely overlapped with a second actual block adjacent to the first actual block). The ordinate denotes an interpolation coefficient a based on a smaller one of interpolation coefficients of the two actual blocks that overlap the imaginary block. This is because, as described above with reference to FIGS. 9A and 9B, the actual blocks can be corrected in units of one line by performing the delay processing using the FIFO memory 342a. Therefore, the ordinate has a minimum value of 0 (i.e., a state where one actual block completely overlaps the imaginary block) and a maximum value of 0.5 (i.e., a state where each of the two adjacent actual blocks overlaps the imaginary block by 0.5 lines).

In the example shown in FIG. 10, the graph is illustrated on the basis of the position of a G actual block as a reference. Specifically, the interpolation coefficient of the G actual block is 0 when the amount of deviation of the corresponding imaginary block is 0 or 1, and is 0.5 when the amount of deviation of the imaginary block is 0.5. The interpolation coefficient of each of R and B actual blocks is 0.5 when the amount of deviation of the corresponding imaginary block is 0 or 1, and is 0 when the amount of deviation of the imaginary block is 0.5.

In the graph in FIG. 10, R, G, and B lines all meet at two positions corresponding to when the amount of deviation of the corresponding imaginary blocks is 0.25 and 0.75, respectively. This means that, when the amount of deviation of the corresponding imaginary blocks is equal to these values, the interpolation coefficients of R, G, and B actual blocks are the same. In the example in FIG. 10, the interpolation coefficient in this case is 0.25.

Specifically, as shown in FIGS. 7A to 9B, when a lag between the output signals from the pixel arrays 311 to 313 is equivalent to 0.5 lines, each imaginary block is set so that the interpolation coefficient a is equal to 0.25 (or 0.75(=1−0.25)), whereby the R, G, and B actual blocks expressing the read signals of the same image section overlap the corresponding imaginary blocks by the same percentage.

As described above, in the example shown in FIGS. 9A and 9B, the imaginary blocks can be set so as to be overlapped by the same percentage (75%) with the corresponding actual blocks expressing the read signals of the same image section. However, not all of the R, G, and B actual blocks can always be made to overlap the corresponding imaginary blocks by the same percentage, depending on the amount of misregistration of the output signals.

Figure 11B:
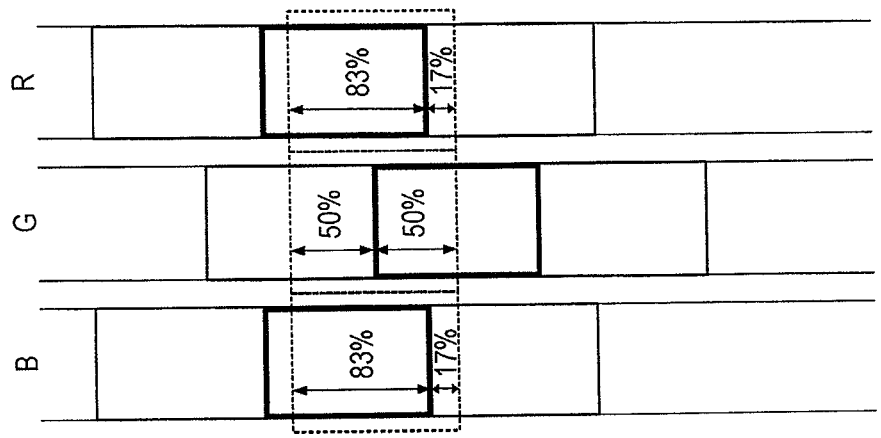
FIGS. 11A and 11B illustrate another example of the interpolation process between two points in the slow scanning direction according to the exemplary embodiment.
Figure 11A:
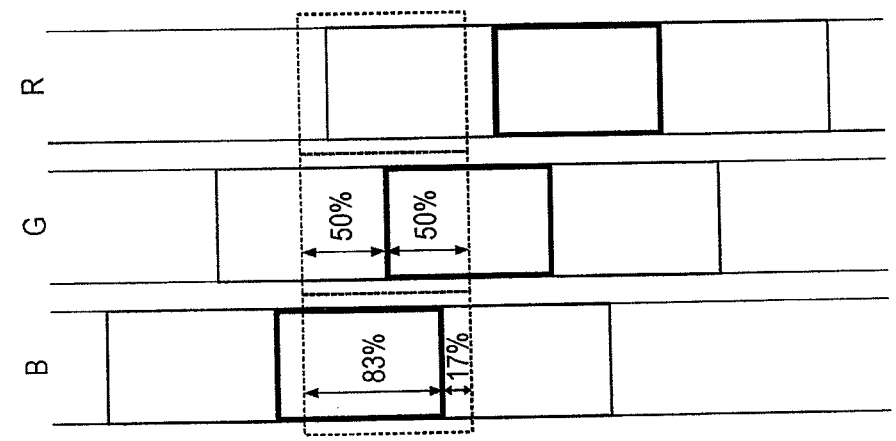

FIGS. 11A and 11B illustrate another example of the two-point interpolation process according to this exemplary embodiment.

In the example shown in FIGS. 11A and 11B, a lag between the output signals from the pixel arrays 311 to 313 is equivalent to ⅔ of a line. Furthermore, in this example, the B imaginary block is overlapped by 83% with an actual block (indicated by a solid line) expressing a read signal of the same image section in the image. The G imaginary block is overlapped by 50% with an actual block (indicated by a solid line) expressing a read signal of the same image section in the image. As shown in FIG. 11A, the R imaginary block is not overlapped with an actual block (indicated by a solid line)

expressing a read signal of the same image section. However, by using the FIFO memory 342a to delay the R read signal by one line, the R imaginary block becomes overlapped with the R actual block (solid line) by 83%, as shown in FIG. 11B.

When the two-point interpolation process is performed on the R, G, and B output signals, the correction amount for the G color, which corresponds to an interpolation coefficient of 0.5, is greater than the correction amount for the two remaining colors, which corresponds to an interpolation coefficient of 0.83 (or 0.17 (=1−0.83)). Therefore, condition 2 described above is satisfied. In addition, since the correction amount is substantially the same for the R and B colors, condition 1 is also satisfied. The intensity DOUT of the output signal of each imaginary block can be obtained by using the aforementioned mathematical expression (1).

Figure 12:
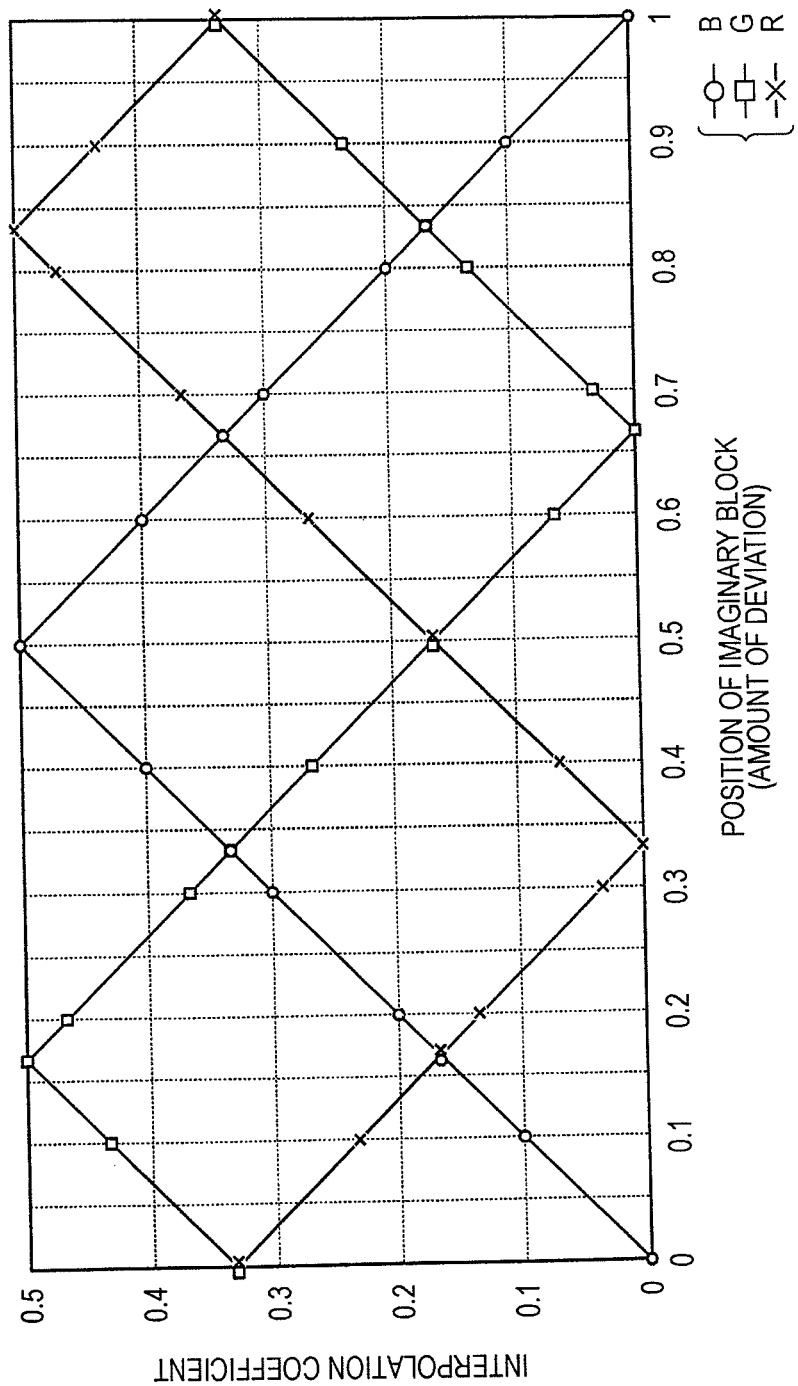
FIG. 12 illustrates the relationship between the position of an imaginary block and an interpolation coefficient in the example shown in FIGS. 11A and 11B.

FIG. 12 illustrates the relationship between the position of an imaginary block and an interpolation coefficient in the example shown in FIGS. 11A and 11B.

In a graph shown in FIG. 12, the abscissa and the ordinate are the same as those of the graph shown in FIG. 10. The graph in the example in FIG. 12 is illustrated on the basis of the position of a B actual block as a reference. Specifically, the interpolation coefficient of the B actual block is 0 when the amount of deviation of the corresponding imaginary block is 0 or 1, and is 0.5 when the amount of deviation of the imaginary block is 0.5. The interpolation coefficient of an R actual block is 0 when the amount of deviation of the corresponding imaginary block is 0.33, and is 0.5 when the amount of deviation of the imaginary block is 0.83.

According to the example in FIG. 12, the interpolation coefficient for the G color is at a maximum only when the amount of deviation of the corresponding imaginary block is between 0 and 0.33. When the amount of deviation of the imaginary block is a value other than these values, at least one of the interpolation coefficient for the B color and the interpolation coefficient for the R color is greater than the interpolation coefficient for the G color. Therefore, in order to satisfy condition 2 described above, the amount of deviation of the imaginary block needs to be between 0 and 0.33.

When the amount of deviation of the imaginary block is 0, the interpolation coefficient for the G color is equal to the interpolation coefficient for the R color. Furthermore, when the amount of deviation of the imaginary block is 0.33, the interpolation coefficient for the G color is equal to the interpolation coefficient for the B color. Moreover, when the amount of deviation of the imaginary block is 0.17, the interpolation coefficient for the B color is equal to the interpolation coefficient for the R color. Therefore, in order to satisfy condition 1, the amount of deviation of the imaginary block may be set to 0, 0.17, or 0.33.

Accordingly, the two-point interpolation process that satisfies conditions 1 and 2 described above is achieved. As condition 2 in this exemplary embodiment, the imaginary block is set such that the correction amount for the G output signal is the largest (in other words, the correction amount for the G output signal is not smaller than the correction amount for the output signals of the two remaining colors). Alternatively, if prevention of deterioration in image quality is to be prioritized by increasing the correction amount for output signals of colors other than the G color relative to the correction amount for the G output signal, other conditions for improving the image quality may be used in place of condition 2.

Configuration of Image Forming Apparatus

An image forming apparatus equipped with the aforementioned image reading device 110 will now be described as another exemplary embodiment.

Figure 13:
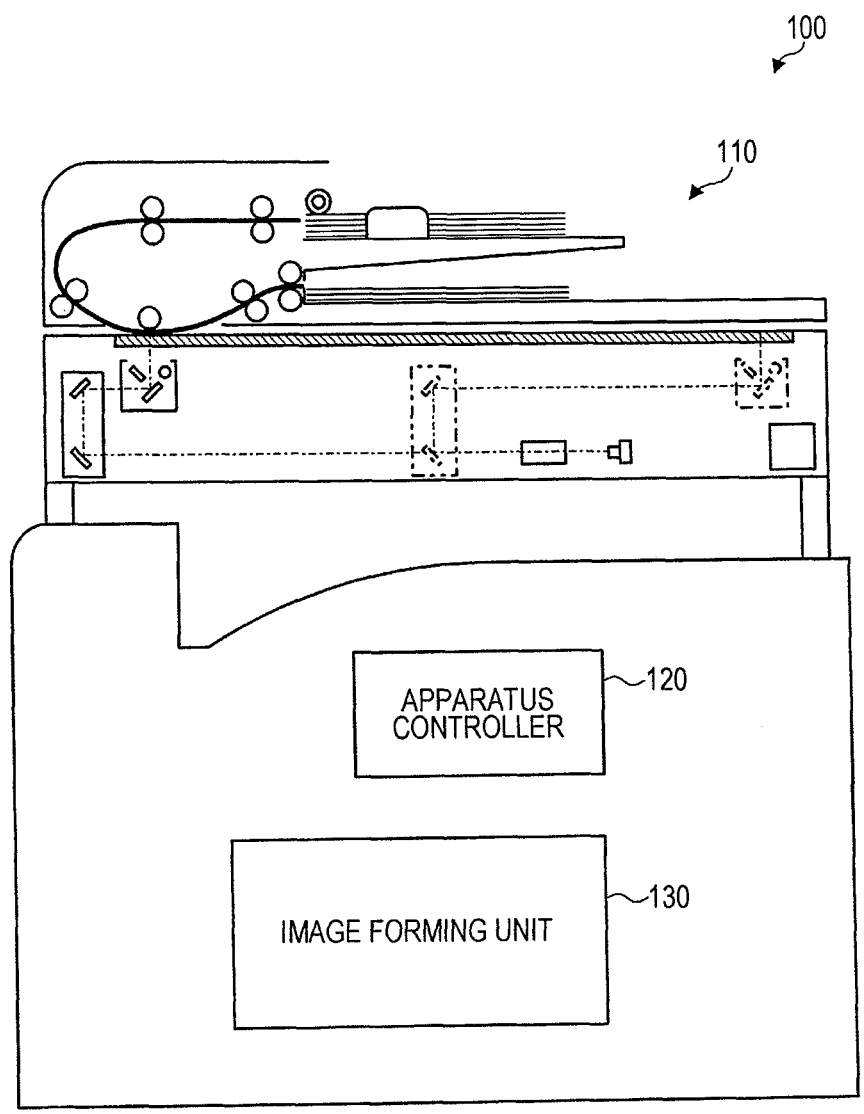
FIG. 13 illustrates a functional configuration of an image forming apparatus equipped with the image reading device according to the exemplary embodiment.

FIG. 13 illustrates a functional configuration of the image forming apparatus equipped with the image reading device 110 according to the exemplary embodiment described above.

An image forming apparatus 100 shown in FIG. 13 includes the image reading device 110, an apparatus controller 120 that controls the operation of the apparatus, and an image forming unit 130 that forms an image on paper, which is a medium, by using an image forming material, such as toner or ink.

The image reading device 110 has a configuration similar to that of the image reading device 110 shown in FIG. 1. The image reading device 110 has a function of performing various kinds of processing, such as black shading.

The apparatus controller 120 includes a central processing unit (CPU), a read-only memory (ROM) that stores a program to be executed by the CPU, and a random access memory (RAM) serving as a working memory. The apparatus controller 120 controls various kinds of processing on the basis of a preinstalled program and various settings. The various kinds of processing include controlling the operation of the image reading device 110 and the image forming unit 130, performing display operation on a display device (not shown), and performing input reception and data exchange via an interface (not shown). Moreover, the apparatus controller 120 generates an image to be formed on a medium.

The image forming unit 130 prints an image read by the image reading device 110 onto a medium, such as paper, by using an image forming material, such as toner or ink. The printing method used in this case is not limited. Specifically, the image forming unit 130 in this exemplary embodiment may be constituted of printing units of various types, such as an electrophotographic type, an inkjet type, and a thermal type.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
a reading unit that includes a plurality of read pixel-arrays and that converts a signal charge obtained from pixels in each read pixel-array to an electric signal and outputs the electric signal as a read signal of each read pixel-array;
a first correcting unit that individually delays the read signals of the respective read pixel-arrays output from the reading unit so as to correct misregistration of the read signals; and
a second correcting unit that corrects the misregistration of the read signals of the respective read pixel-arrays corrected by the first correcting unit by performing a two-point interpolation process so that a correction amount for the read signal of one specific read pixel-array among the plurality of read pixel-arrays is not smaller than a correction amount for the read signal or signals of the remaining read pixel-array or pixel-arrays.

2. The image reading device according to claim 1, wherein the plurality of read pixel-arrays in the reading unit includes three read pixel-arrays set in correspondence with red, green, and blue colors, and wherein the second correcting unit sets the read pixel-array corresponding to one specific color as the one specific read pixel-array and performs the two-point interpolation process so that the correction amount for the read signal of the one specific read pixel-array is not smaller than the correction amount for the read signals of the two read pixel-arrays corresponding to the two remaining colors.

3. The image reading device according to claim 1, wherein the second correcting unit performs the two-point interpolation process so that the correction amount is substantially the same for the read signals of the remaining read pixel-arrays.

4. The image reading device according to claim 2, wherein the second correcting unit performs the two-point interpolation process so that the correction amount is substantially the same for the read signals of the remaining read pixel-arrays.

5. The image reading device according to claim 1, wherein the second correcting unit performs the two-point interpolation process so that the correction amount is substantially the same for the read signals of all of the read pixel-arrays.

6. The image reading device according to claim 2, wherein the second correcting unit performs the two-point interpolation process so that the correction amount is substantially the same for the read signals of all of the read pixel-arrays.

7. The image reading device according to claim 3, wherein the second correcting unit performs the two-point interpolation process so that the correction amount is substantially the same for the read signals of all of the read pixel-arrays.

8. The image reading device according to claim 4, wherein the second correcting unit performs the two-point interpolation process so that the correction amount is substantially the same for the read signals of all of the read pixel-arrays.

9. The image reading device according to claim 2, wherein the one specific color is the green color.

10. An image reading device comprising:
a reading unit that reads an image for each of red, green, and blue colors, and outputs a read signal corresponding to each of the red, green, and blue colors;
a first correcting unit that individually delays the read signals of the red, green, and blue colors output from the reading unit so as to correct misregistration of the read signals; and
a second correcting unit that corrects the misregistration of the read signals of the red, green, and blue colors corrected by the first correcting unit by performing a two-point interpolation process so that a correction amount for the read signal of the green color is not smaller than a correction amount for the read signals of the two remaining colors.

11. The image reading device according to claim 10, wherein the second correcting unit performs the two-point interpolation process so that the correction amount is substantially the same for the read signals of the red, green, and blue colors.

12. An image forming apparatus comprising:
a reading unit that includes three read pixel-arrays set in correspondence with red, green, and blue colors and outputs a read signal of each read pixel-array;
a first correcting unit that individually delays the read signals of the respective read pixel-arrays output from the reading unit so as to correct misregistration of the read signals;
a second correcting unit that corrects the misregistration of the read signals of the respective read pixel-arrays corrected by the first correcting unit by performing a two-point interpolation process so that a correction amount for the read signal of one specific read pixel-array among the plurality of read pixel-arrays is not smaller than a correction amount for the read signals of the two remaining read pixel-arrays; and
an image forming unit that forms an image on a medium by using an image forming material on the basis of the read signals corrected by one of or both of the first correcting unit and the second correcting unit.

13. The image forming apparatus according to claim 12, wherein the one specific read pixel-array is the read pixel-array corresponding to the green color.

14. The image forming apparatus according to claim 12, wherein the second correcting unit performs the two-point interpolation process so that the correction amount is substantially the same for the read signals of all of the read pixel-arrays.

15. The image forming apparatus according to claim 13, wherein the second correcting unit performs the two-point interpolation process so that the correction amount is substantially the same for the read signals of all of the read pixel-arrays.

* * * * *